US008689833B2

(12) United States Patent
Berner et al.

(10) Patent No.: US 8,689,833 B2
(45) Date of Patent: Apr. 8, 2014

(54) VALVE DEVICE

(75) Inventors: Michael Berner, Kirchheim (DE); Rolf Berger, Aichtal (DE)

(73) Assignee: Festo AG & Co. KG, Esslingen (DE)

( * ) Notice: Subject to any disclaimer, the term of this patent is extended or adjusted under 35 U.S.C. 154(b) by 245 days.

(21) Appl. No.: 13/264,124

(22) PCT Filed: Feb. 26, 2010

(86) PCT No.: PCT/EP2010/001183

§ 371 (c)(1), (2), (4) Date: Oct. 12, 2011

(87) PCT Pub. No.: WO2010/118797

PCT Pub. Date: Oct. 21, 2010

(65) Prior Publication Data

US 2012/0037250 A1 Feb. 16, 2012

(30) Foreign Application Priority Data

Apr. 17, 2009 (DE) ........................ 10 2009 017 861

(51) Int. Cl.

*F16K 1/00* (2006.01)
*F15B 13/00* (2006.01)
*F16K 31/06* (2006.01)

(52) U.S. Cl.

USPC ....................... 137/884; 137/271; 137/596.17

(58) Field of Classification Search

USPC .................... 137/884, 269, 271, 596, 596.14, 137/596.17, 613, 599.03, 599.08, 861, 862, 137/872, 883

See application file for complete search history.

(56) References Cited

U.S. PATENT DOCUMENTS

| | | | |
|---|---|---|---|
| 3,707,163 A | 12/1972 | Hugler | |
| 6,715,400 B2 * | 4/2004 | Muth et al. | 91/54 |
| 7,191,800 B2 * | 3/2007 | Berner et al. | 137/884 |
| 8,015,991 B2 * | 9/2011 | Kaitsuka | 137/269 |

FOREIGN PATENT DOCUMENTS

| | | |
|---|---|---|
| DE | 10208390 | 5/2003 |
| DE | 10315460 | 10/2004 |
| DE | 102007016579 | 10/2008 |
| EP | 0391269 | 10/1990 |
| EP | 1748238 | 1/2007 |
| WO | WO2004027268 | 4/2004 |

OTHER PUBLICATIONS

Machine Translation of DE 10315460 to Staiger, Bruno, Translation performed on Jul. 30, 2013.*

* cited by examiner

*Primary Examiner* — John Fox
*Assistant Examiner* — Michael R Reid
(74) *Attorney, Agent, or Firm* — Hoffmann & Baron, LLP

(57) ABSTRACT

The invention relates to a valve device for the fluid supply of fluid consumers, comprising several valve modules (2) arranged next to each other in the direction of stacking (3). Said valve modules (2) respectively comprise a plate-shaped channel body (11) provided with a feed channel recess (35) and/or a venting channel recess (36) and four 2/2 distributing valves (41, 42, 45, 46) respectively having a first and a second fluidic connection (47, 48, 49, 50, 51, 52, 55, 56). The four 2/2 distributing valves (41, 42, 45, 46) of the valve module (2) are interconnected in a full bridge arrangement. According to the invention, an additional module (6, 7), which is arranged on the connection surface of the channel body, is connected so it communicates with one or both working channels (21, 22) and is designed to control a fluid flow and/or for determining a parameter of the fluid flow from or to the working channel (21, 22).

12 Claims, 6 Drawing Sheets

VALVE DEVICE

This application claims priority based on an International Application filed under the Patent Cooperation Treaty, PCT/EP2010/001183, filed Feb. 26, 2010, which claims priority to DE102009017861.9, filed Apr. 17, 2009.

BACKGROUND OF THE INVENTION

The invention relates to a valve device for the supply of fluid to fluid consumers, with several valve modules arranged next to one another in a direction of stacking; each valve module comprises a plate-shaped passage body which has a feed passage recess designed for connection with a fluid source, two operating passages provided for coupling to fluid consumers, and a venting passage recess for venting fluid consumers, together with two connection surfaces, parallel and opposite to one another, and outside surfaces aligned at right-angles to the connection surfaces, wherein the connection surfaces determine the direction of stacking and are designed to abut passage bodies adjacent to the connection surfaces; and four 2/2-way valves, each having a first and second fluidic connection and a movable valve member for the setting of a free fluid passage cross-section between the first and second fluidic connection, wherein the four 2/2-way valves of the valve modules are connected to one another in a full bridge arrangement in which the first fluidic connections of the first and second 2/2-way valves are connected to the feed passage recess, the second fluidic connection of the first 2/2-way valve and the first fluidic connection of the fourth 2/2-way valve are connected to a first operating passage, the second fluidic connection of the second 2/2-way valve and the first fluidic connection of the third 2/2-way valve are connected to a second operating passage, and the second fluidic connections of the third and fourth 2/2-way valves are connected to the venting passage recess, and wherein each 2/2-way valve includes an electrically operable actuating means which is fitted on to an outer surface of the passage body serving as mounting face, and is designed to switch the respectively assigned cylinder valve member between a closed position and an open position.

Known from DE 102 08 390 A1 is a multiway valve with freely configurable valve function, which includes several pressure medium connections arranged on a valve body and also an electrically actuable drive unit to actuate a valve mechanism accommodated in the valve body. The valve mechanism consists of at least four individual 2/2-way valves connected in series, with pressure medium connections arranged between them. Each individual main valve is assigned an electrical drive element which is connected to a common electronic control unit. Various directional control functions may be freely selected and realised by the multiway valve.

Known from DE 103 15 460 B4 is a valve assembly for gaseous and fluid media. This comprises at least four 2/2-way valves interlinked in a full bridge arrangement to form a multiway valve unit which is assigned an electrical control unit with at least one bus connection, at least one sensor connection, and at least one pulse width modulation. The directional control valves are in the form of fast-acting plate armature valves with a switching time of less than 5 milliseconds.

EP 0 391 269 B1 discloses a solenoid valve bank with a multiplicity of solenoid valves mounted on a common baseplate and supplied jointly with compressed air on the input side via a passage integrated in the baseplate. The passage is connected to a stub, which opens out on two opposite surfaces of the baseplate.

Known from EP 1 748 238 B1 is a solenoid valve which has a baseplate through which run valve passages, and a magnetic head with an electromagnet device. Between the magnet head and the baseplate, which are arranged consecutively along a main axis, is a valve chamber communicating with several valve passages. The valve chamber contains a plate-shaped magnet armature serving as valve member, which may be attracted by a stationary magnetic core assembly of the electromagnet device.

DE 10 2007 016 579 A1 discloses an adapter plate which comprises at least one additional valve and is designed for fitting on to a baseplate containing one or more basic valves. With the aid of the adapter plate, the additional valve or valves may be fitted to different basic valves.

SUMMARY OF THE INVENTION

The problem of the invention is to provide a valve device with a functional scope which may be changed easily.

This problem is solved for a valve device of the type described above by the features of claim 1. Here it is provided that, at a connection face of the passage body, an additional module is mounted and connected so as to communicate with one or both operating passages and designed to control a fluid flow and/or to determine a parameter of the fluid flow from or to the operating passage.

The additional module serves to influence the fluid flows provided from the valve module into the operating passages, and/or to determine parameters such as for example pressure and/or temperature and/or the flow rate of the fluid flow or flows. The additional module may be used for example to restrict the fluid volume flow through one of the operating passages. Preferably the additional module is designed for the temporary opening of a connection between the first and second operating passages.

It is expedient if the additional module is designed for lining up side by side in a direction of assembly at right-angles to to the direction of stacking, at the connection face of the valve module or another additional module, in order to form an additional module assembly. In this way it is ensured that additional modules fitted to one or several valve modules do not obstruct the stacking of the valve modules on the valve device. Also, by this means and in a simple manner, a communicating connection between the additional module assigned to the respective valve module and the operating passages of the valve module opening out at the connection face is ensured. In addition it is advantageous that, in the direction of assembly, several additional modules may be attached, arranged next to one another, to a valve module, making it possible to expand the functional scope of the valve module by several additional functions. is a flow chart showing the steps directed to the manufacture of the target reactor based on the comparison with the standard reactor.

Preferably the additional module includes a passage unit with a fluid passage for communicating connection with one or both operating passages of the passage body, plus a functional unit fitted on to the passage unit for influencing and/or scanning the fluid flows in the fluid passage from or to one or both operating passages. The fluid passage serves for transferring the fluid provided in the operating passage of the valve module to a connection face of the additional module, at which a further additional module or a fluid consumer may be connected for the purpose of communication. Because of the modular structure, the additional module may be adapted easily to meet different requirements, by for example replacing the functional unit. The functional unit may be for example a valve device, a detection device, or a combination of such devices.

In an advantageous embodiment of the invention it is provided that the fluid passage passes through the passage unit and, when the additional module is fixed to the passage body, is aligned at right-angles to to the connection face, and that there is formed in the passage unit a connecting passage for a communicating connection between the fluid passage and the functional unit. The fluid passage provides a communicating connection between the operating passage which opens out at the connection face of the passage body and a connection orifice opening out at an end face of the passage unit at a distance from the connection face. A connecting passage connected to the fluid passage ensures a fluid flow between operating passage and functional unit.

It is expedient if the fluid passage extends between opposite contact faces of the passage unit. Moreover, the alignment of the fluid passage at right-angles to the connection face of the valve module ensures that several additional modules may be arranged next to one another in the direction of assembly with the minimum possible space requirement.

In a further variant of the invention it is provided that the fluid passage is designed to accommodate mounting means, used to fix the additional module to the passage body or to another additional module. In this way the fluid passage is also used as a recess for the mounting means which ensure the fixing of the additional module to the valve module. This multiple use of the fluid passage makes possible a simple design of the passage unit.

Preferably the mounting means are provided at opposite end areas with a head section and a shank section in one direction of longitudinal extent, with a longitudinal recess passing through them, extending between shank section and head section and opening out at each end to allow communicating connection between additional modules arranged next to one another in the direction of assembly. The shank section is designed to engage in the operating passage of the passage body or in the head section of further mounting means. The longitudinal recess serves to provide a free flow cross-section through the mounting means, which pass through the fluid passage and are fixed to the passage body or to a further additional module. The shank section is designed for positive and/or non-positive engagement of the mounting means in the connection orifice of the operating passage. Alternatively the shank section may also be located in a head section of further mounting means designed to match the connection orifice of the operating passage. The head section also ensures the force transmission between mounting means and passage unit, for example through form-fitting relative to the passage unit by means of an end thickening of the mounting means.

It is expedient if the mounting means have a connection recess communicating with the longitudinal recess and aligned at right-angles to the direction of longitudinal extension. This connection recess is designed to provide a communicating connection between the longitudinal recess and the fluid passage, also the connecting passage. Consequently the fluid flowing through the longitudinal recess may be guided at least partly into the fluid passage and from there in the direction of the connecting passage, to interact with the functional unit mounted at the end of the connecting passage.

In a development of the invention it is provided that the functional unit is in the form of a detection device, in particular a pressure sensor and/or a flow sensor and/or a temperature sensor and/or a humidity sensor for determining an electrical measuring signal based on fluid flowing in the operating passage, and for supplying this measuring signal to a control unit. One or more parameters of the fluid supplied at the operating passage may be determined by such a functional unit. The electrical measuring signals of the functional unit are transferred to a control unit which is set up to evaluate the measuring signals and is able to carry out control or regulation of the valve module to control the fluid provided at the operating passage.

Preferably the functional unit is in the form of a 2/2-way valve. This makes it possible to influence the fluid provided at one or both operating passages of the valve module.

It is advantageous for the passage unit to include a first and a second connection passage, wherein the first connecting passage makes communicating connection with the first fluid passage and a first fluidic connection of the functional unit, and the second connecting passage makes communicating connection with the second fluid passage and a second fluidic connection of the functional unit. By this means, the additional module may be looped-in between the valve module and a fluid consumer, with no impairment of the functional scope of the valve module. Instead, the functional scope of the valve module may be expanded through combination with the additional module, since the additional module for example opens a temporary connection between the operating passages of the valve module, without the need for the valve module to open simultaneous communicating connections to the feed passage recess and/or the venting passage recess.

It is advantageous if 2/2-way valves are in the form of valve units in which the actuating means form with one valve section a compact unit which is attached to the mounting face of the passage body, wherein the valve section comprises the first and second fluidic connection plus a valve seat 89, relative to which the valve member 87 is movably mounted, in order to control the free fluid passage cross-section between the first and second fluidic connection, between a closed position and an open position. In this embodiment of the invention, the 2/2-way valves are located entirely outside the passage body and are mounted as compact units on the mounting face of the passage body. Besides the electrically operable actuating means 76, the 2/2-way valves have the valve section used for fluid guidance. The valve section has a fluid passage which opens out at an outside surface in two fluidic connections, at a distance from one another. Formed in the fluid passage is a valve seat which allows sealing contact of the valve member to close the free cross-section of the fluid passage. The valve member may be moved, by an application of force from the actuating means, from sealing contact at the valve seat into an open position in which the valve seat and therefore the fluid passage cross-section are opened. The actuating means can therefore control the valve member in such a way that the latter adopts either the closed position or the open position.

BRIEF DESCRIPTION OF THE DRAWINGS

An advantageous embodiment of the invention is depicted in the drawing and shows in.

DETAILED DESCRIPTION OF THE PREFERRED EMBODIMENTS

Figure 1:
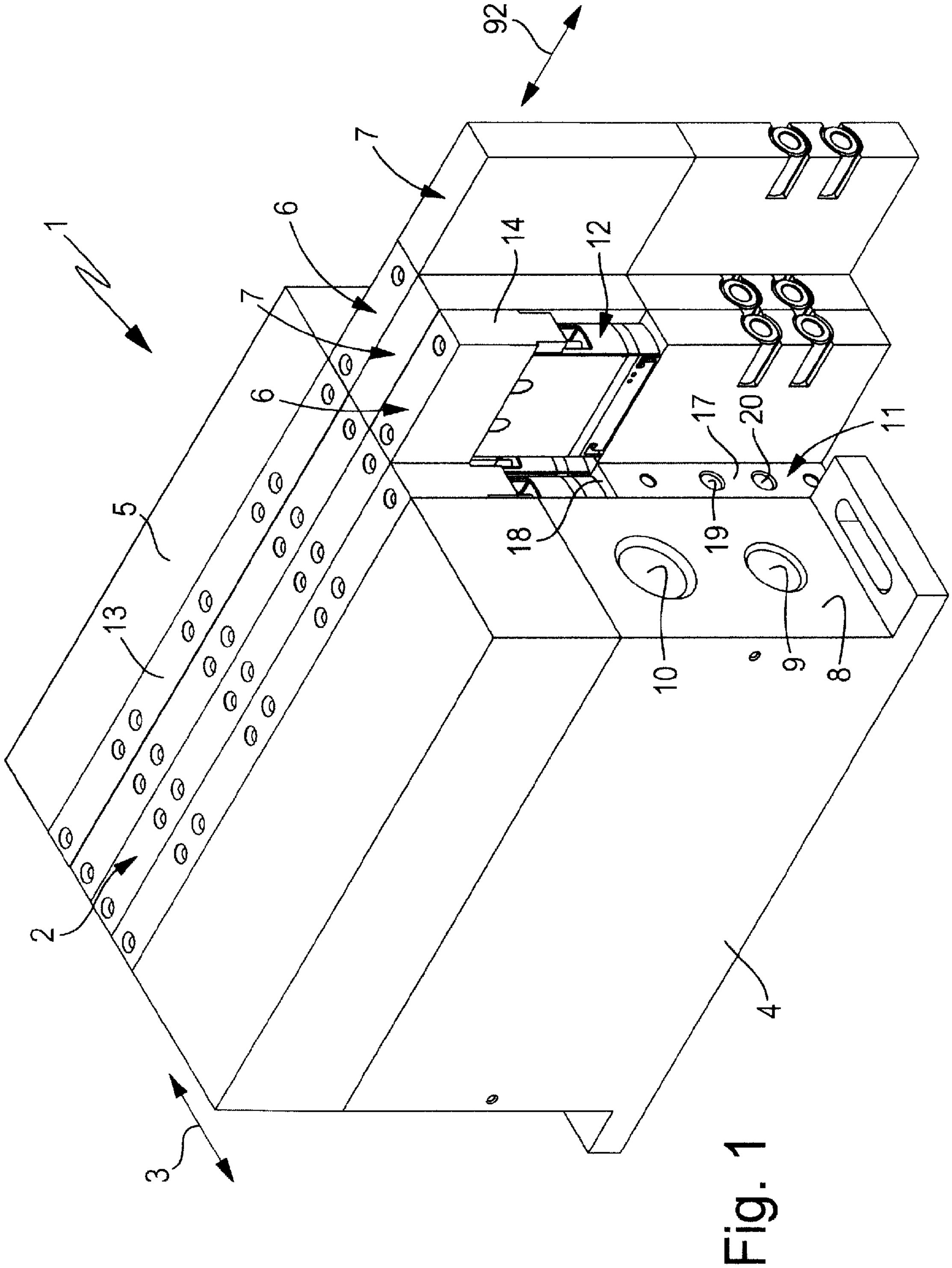
FIG. 1 a perspective view of a valve device

A valve device 1 shown in FIG. 1 is provided for the fluid supply to several fluid consumers, not illustrated, for example pneumatic working cylinders. The valve device 1 serves for the control and/or regulation of a multiplicity of fluid flows which it is intended to provide to the respective fluid consumers from a fluid source, not illustrated.

The valve device 1 comprises several valve modules 2, shown by way of example in plate-like form and arranged next to one another in a direction of stacking 3. The valve modules 2 are arranged between a base element 4 and an end plate 5, which in each case bound the valve device 1 along the direction of stacking 3.

Some of the valve modules 2 are assigned additional modules 6, 7, for example in the form of valve elements or sensor elements. As shown by FIG. 1, the additional modules 6, 7 may be arranged next to one another in a direction of assembly 92 at right-angles to the direction of stacking 3, allowing expansion of the functional scope of the valve modules 2 as required. The valve modules 2 of the valve device 1 may however also be used without the assigned additional modules 6, 7. In the embodiment depicted, additional module 6 is in the form of an additional valve, while additional module 7 is in the form of a measuring module.

The base element 4 has at one end face 8 a feed orifice 9 for the connection of a fluid line, not illustrated, and a vent orifice 10 which may for example serve as an outlet for fluid which has already flowed through the valve device 1 and the fluid consumer (not shown).

In the depicted embodiment of the valve device 1, several valve modules 2 are arranged next to one another on the base element 4 in the direction of stacking 3, all having the same structure, described in detail below. The valve modules 2 have the task of supplying the fluid provided through the base element 4, in the desired manner, to the fluid consumers (not shown), and if necessary returning to the base element 4 fluid flowing back from fluid consumers.

Each of the valve modules 2 shown in detail in FIGS. 2 to 5 comprises a plate-shaped passage body 11 and valve units 12, of identical design, mounted on the passage body 11.

The valve units 12 of the valve module 2 are provided with a cover strip 13, which may be designed for example for sound insulation and/or shielding of the valve units 12 from environmental influences, in particular contamination, and/or for electrical contacting of the valve units 12. The valve unit 12 of the additional module 6 is provided with a hood 14 which performs the same functions for the individual valve unit 12 as does the cover strip 13 for the several valve units 12 of the valve module 2.

The passage body 11, which may for example have a cubic external shape, has two opposite connection surfaces 15, 16, the surface normals of which, not illustrated, run parallel to the direction of stacking 3. For example the first connection surface 15 points in the direction of the base element 4, and correspondingly the second connection surface 16 points towards the end plate 5. In the depicted embodiment of the passage body 11, the connection surfaces 15, 16 form its largest surface. The passage body 11 has narrow sides aligned at right-angles to the connection surfaces 15, 16, which have surface normals, not shown, running at right-angles to the direction of stacking 3. A shorter narrow side serves as the connection face 17 and a longer narrow side serves as the mounting face 18.

In the valve module 2 described in detail in FIGS. 3 to 5, connection orifices 19, 20 of the operating passages 21, 22, described in detail below, open out at the connection face 17. Connection bores 25, 26, 27 and 28 of the operating passages 21, 22 open out at the mounting face 18, as is evident from FIGS. 4 and 5. Connection bores 29, 30, 31, 32 also open out at the mounting face 18, and are in communicating connection with feed passage recesses 35 and venting passage recesses 36 in the passage body 11, which are also described below.

Figure 2:
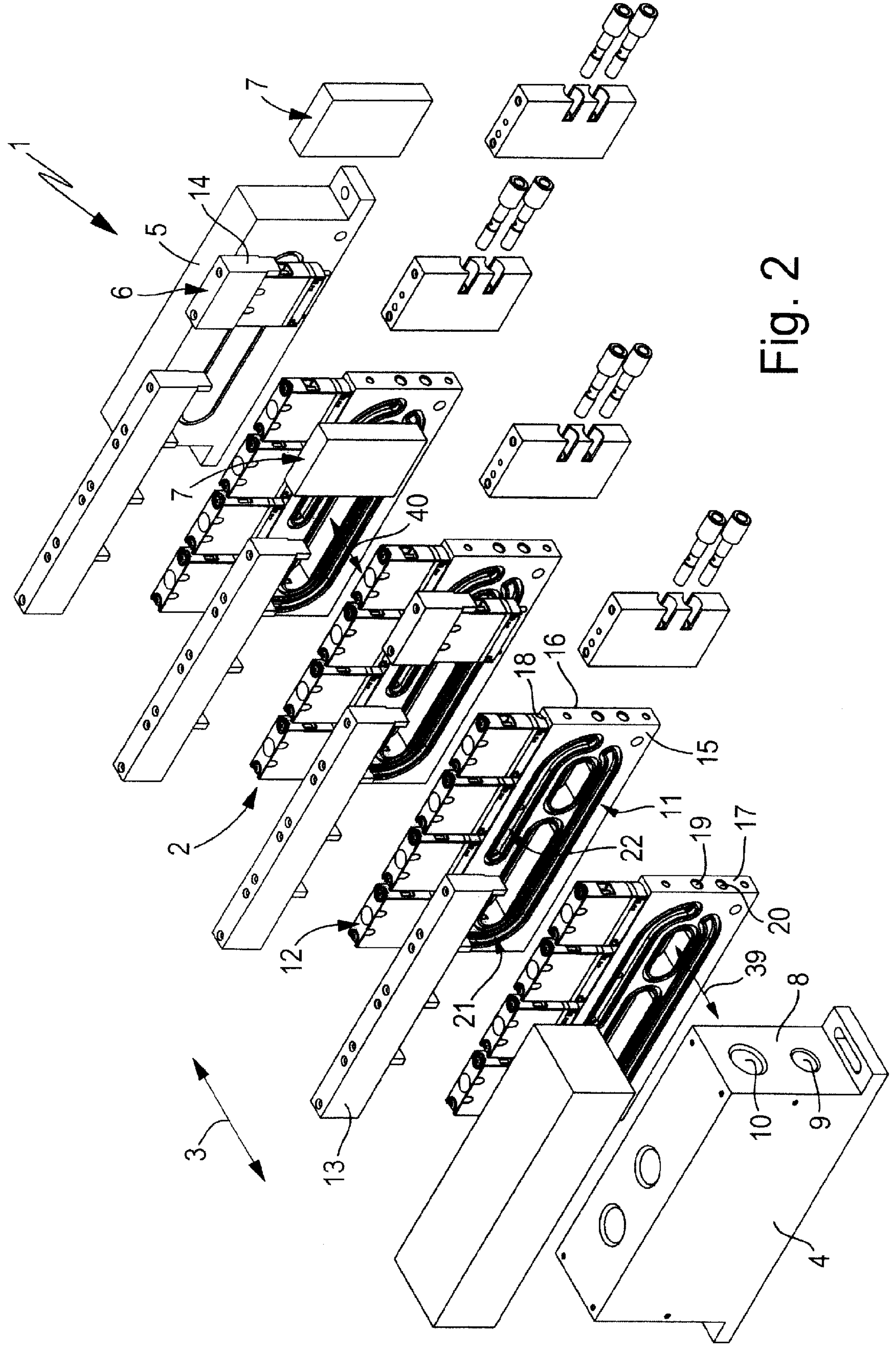
FIG. 2 a perspective exploded view of the valve device according to FIG. 1.
Figure 3:
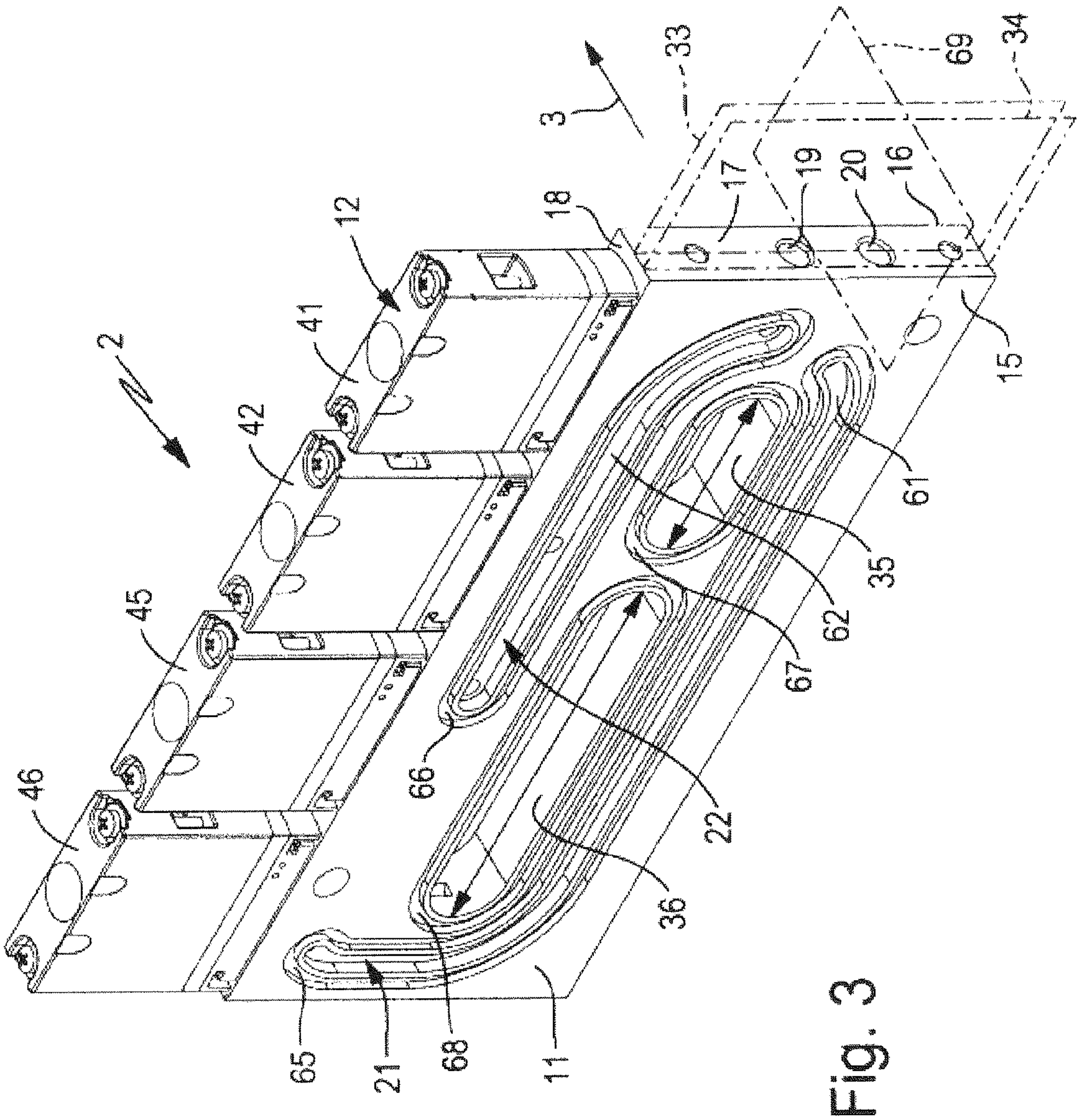
FIG. 3 a perspective view of a valve module from the valve device according to FIGS. 1 and 2
Figure 4:
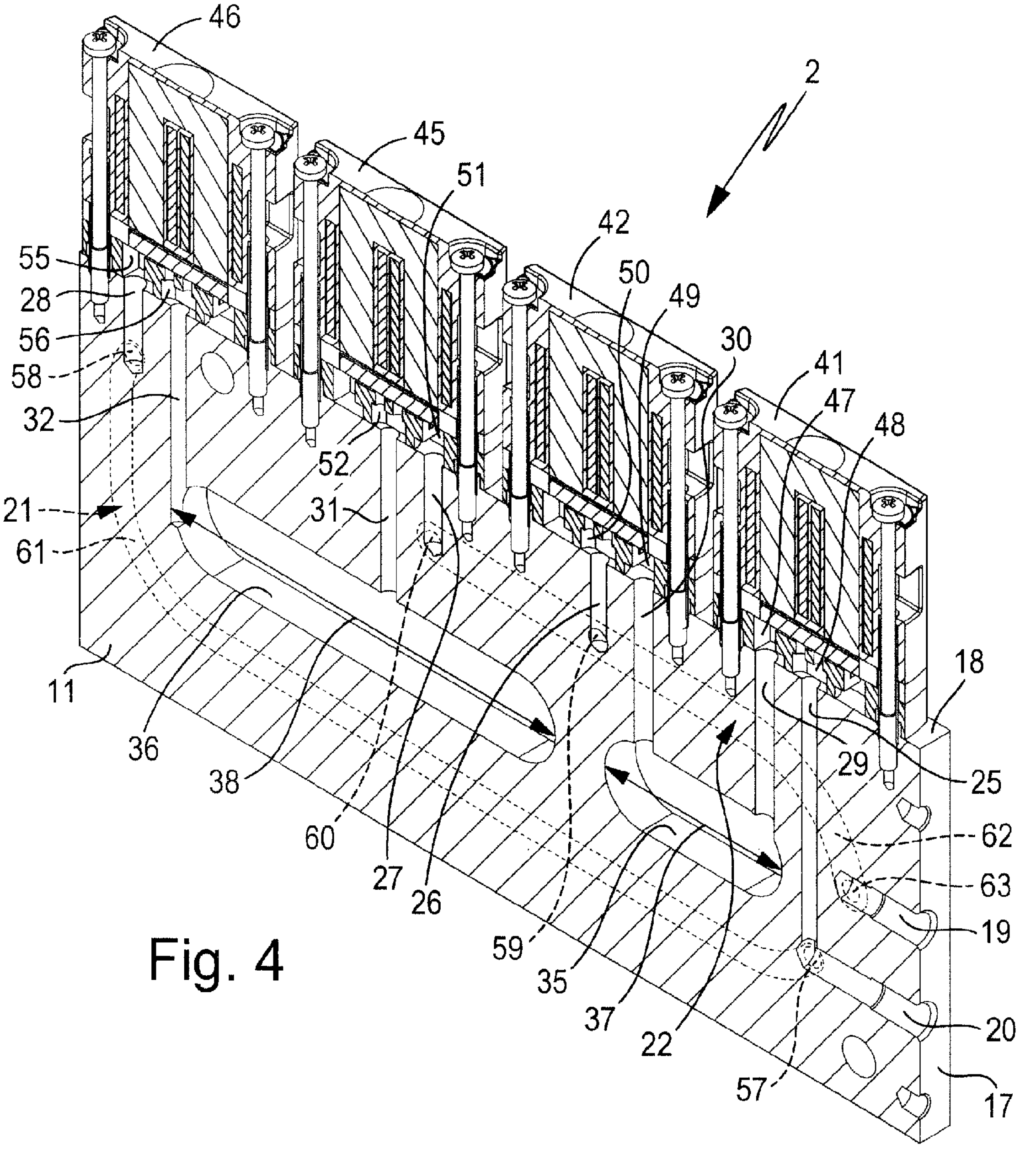
FIG. 4 a perspective sectional view of the valve module according to FIG. 3
Figure 5:
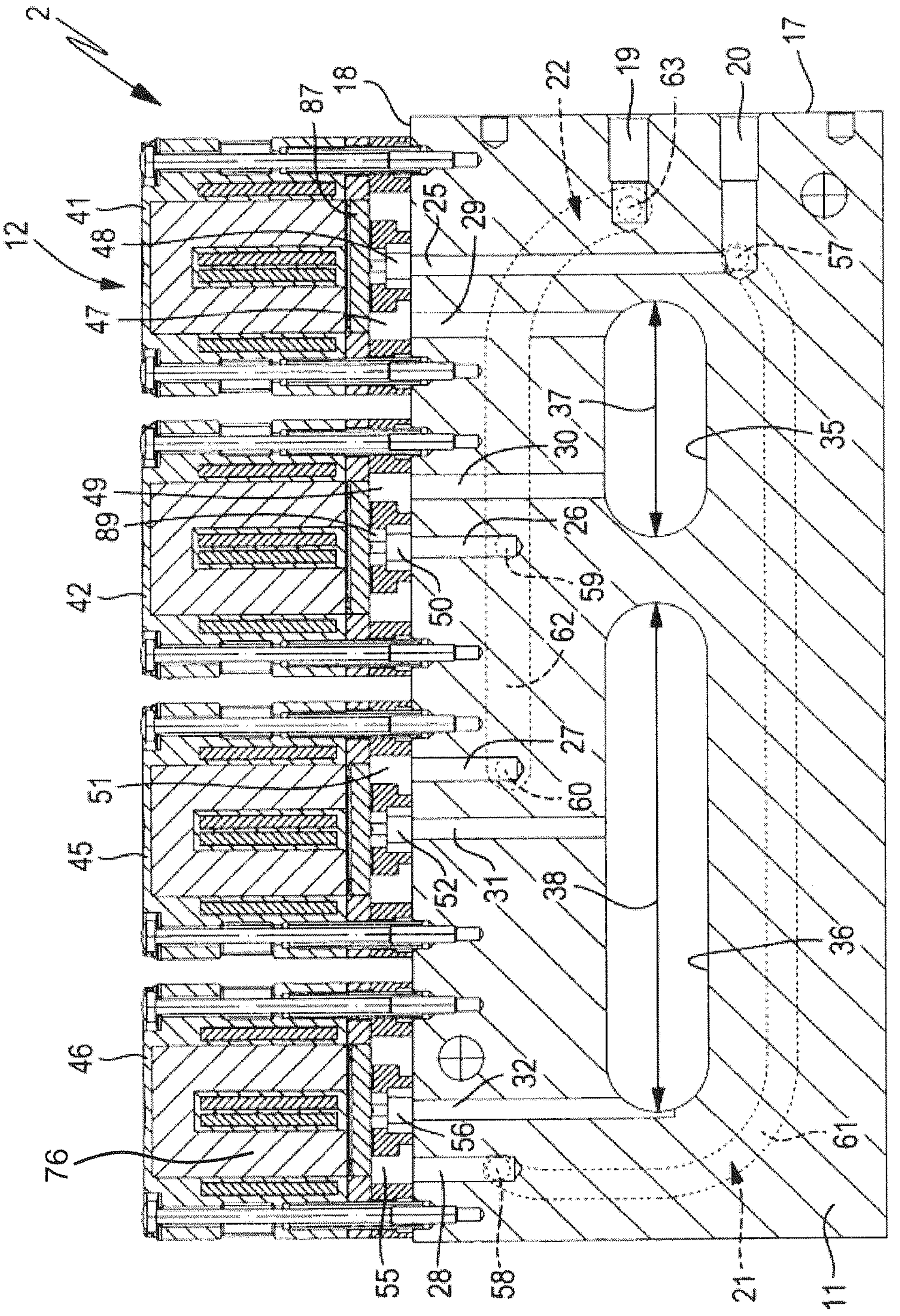
FIG. 5 a flat sectional view of the valve module according to FIG. 3.

As may be inferred from FIGS. 2 to 5, two recesses pass through the passage body 11 in the direction of stacking 3 and serve as feed passage recess 35 or venting passage recess 36; they have an elongated extension in a cross-sectional plane which has a normal vector aligned parallel to the direction of stacking 3. Plotted in each of FIGS. 4 and 5 is a cross-sectional main extension 37 of the feed passage recess 35 and a cross-sectional main extension 38 of the venting passage recess 36. The cross-sectional main extension is a straight line, extending here in the centre of the cross-section with maximum length within a border of the respective cross-section of the feed passage recess 35 or venting passage recess 36. The cross-sectional main extensions 37, 38 are in the present embodiment of the passage body 11 aligned coaxial to one another and run parallel to surface normals, not illustrated, of the connection face 17.

As may be inferred from the exploded drawing of FIG. 2, the feed passage recess 35 and the venting passage recess 36 of the passage bodies 11 of the valve modules 2 lined up in the direction of stacking 3 form a continuous feed passage extending between the base element 4 and the end plate 5 and symbolised by arrow 39, and a continuous venting passage, symbolised by arrow 40. By this means, a centralised supply and disposal of fluid to and from the valve modules 2 is facilitated.

As may be inferred from FIGS. 4 and 5, the operating passages 21 and 22 extend in each case between the connection orifices 20 and 19 respectively provided at the connection face 17, and the connection bores 25 and 28, and 26 and 27 respectively, which open out at the mounting face 18.

The first operating passage 21 provides a communicating connection between the fluid consumer which may be connected at the connection orifice 20 and the first 2/2-way valve 41 together with the fourth 2/2-way valve 46. The second operating passage 22 is provided for communicating connection between the connection orifice 19 and the second 2/2-way valve 42 plus the third 2/2-way valve 45.

The first operating passage 21 is connected to communicate with the second fluidic connection 48 of the first 2/2-way valve 41 and with the first fluidic connection 55 of the fourth 2/2-way valve 46. The second operating passage 22 is connected to communicate with the second fluidic connection 50 of the second 2/2-way valve 42 and with the first fluidic connection 51 of the third 2/2-way valve 45. In addition, the first fluidic connection 47 of the first 2/2-way valve 41 and the first valve connection 49 of the second 2/2-way valve 42 are connected to communicate with the feed passage recess 35. The second fluidic connection 52 of the third 2/2-way valve 45 and the second valve connection 56 of the fourth 2/2-way valve 46 make communicating connection with the venting passage recess 36.

With this configuration of the communicating connections between the operating passages 21, 22 and the feed passage recess 35 and venting passage recess 36 respectively, the 2/2-way valves 41, 42, 45 and 46 are connected to one another in a full bridge arrangement.

The longitudinal axes of the fluidic connections in the passage body 11 are in each case arranged in one of two fluid passage planes 33, 34, spaced apart from one another and substantially parallel to the connection surfaces 15, 16. The longitudinal axes of the connection bores 25, 26, 27, 28 and of the connection bores 29, 30, 31, 32 are arranged in the first fluid passage plane 33 as shown in FIG. 4. The second fluid passage plane 34 is arranged adjacent to the first connection surface 15 and comprises the longitudinal axes of slot-like recesses 61, 62, which are made in the first connection surface 15. Via the operating passage bores 57, 58, provided for example in the form of stubs aligned at right-angles to the connection surfaces 15, 16, the slot-like recess 61 is in communicating connection with the second connection orifice 20 at the connection face 17, and with the connection bores 25 and 28 which open out at the mounting face 18. The slot-like recess 62 is in communicating connection, via the assigned operating passage bores 59, 60, 63, with the connection orifice 19 at the connection face 17, and with the connection bores 26 and 27 which open out at the mounting face 18.

The non-intersecting arrangement of the fluidic connections is evident in FIGS. 4 and 5, in which the slot-like recesses 61, 62 are shown by broken lines, since they lie in the second fluid passage plane 34 which is arranged at a distance from the section plane coinciding with fluid passage plane 33, as may be inferred for example from FIG. 3.

FIG. 3 shows slot-like recesses 65, 66, 67 and 68, running respectively all around the feed passage recess 35, the venting passage recess 36, the slot-like recess 61 and the slot-like recess 62. They serve to hold sealing means, for example in the form of continuous round cord seals, which are not illustrated.

Figure 6:
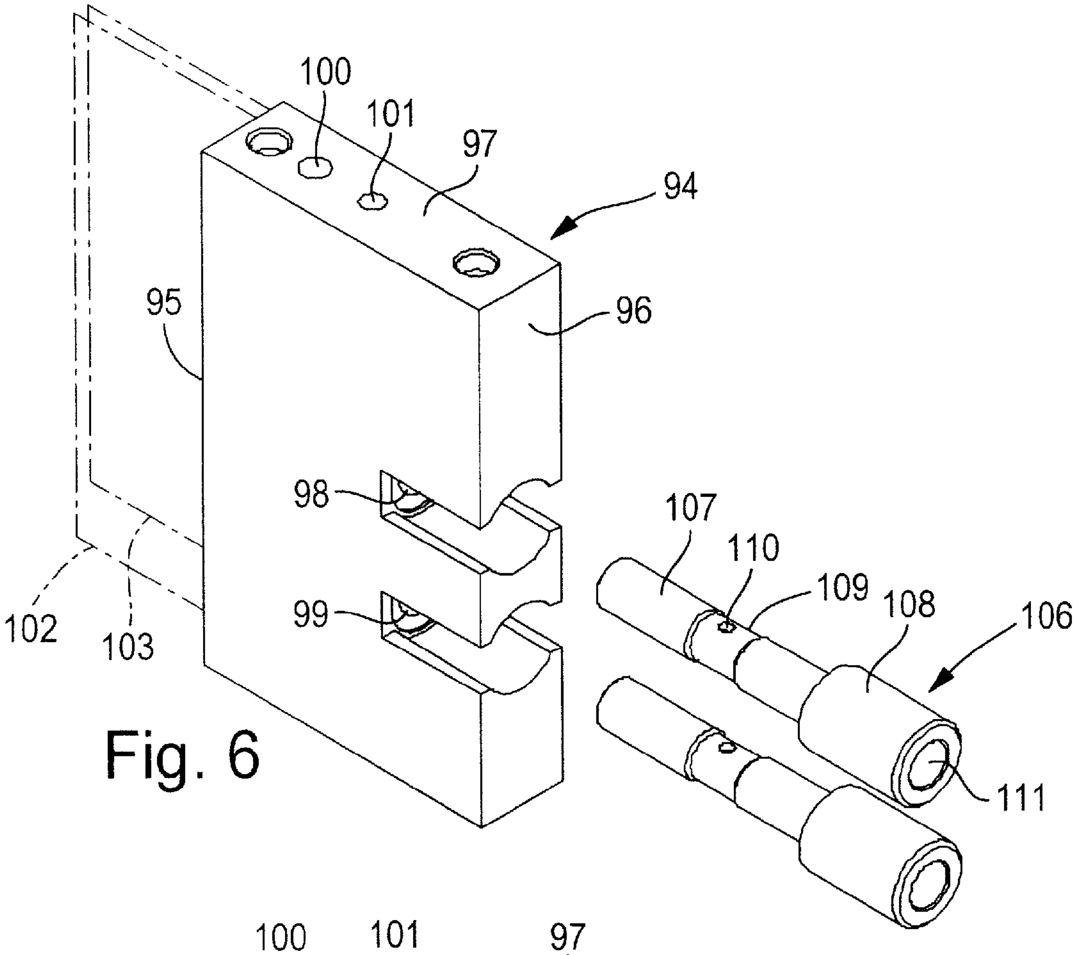
FIG. 6 a perspective view of a passage unit.
Figure 7:
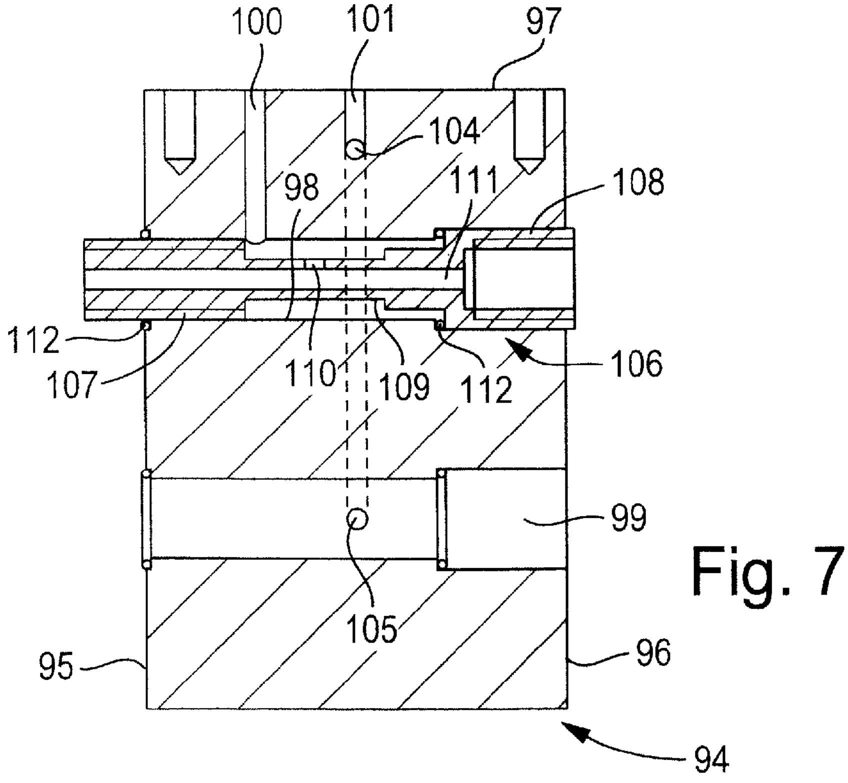
FIG. 7 a sectional view of the passage unit according to FIG. 6.

Shown by way of example in FIGS. 6 and 7 is a passage unit 94, provided for an additional module 6 in the form of an additional valve. The passage unit 94 is designed as a substantially square body, with a connecting surface 95 provided to fit up against the connection face 17 of the valve module 2, and an assembly surface 96 opposite the connecting surface 95, both of which may also be described as contact faces. An attaching surface 97 for connecting a functional unit is located between the connecting surface 95 and the assembly surface 96 and aligned at right-angles to these surfaces.

As revealed by FIG. 7, several recesses pass through the passage unit 94 and are in the form of fluid passages 98, 99 and connecting passages 100, 101. The fluid passages 98, 99 pass through the passage unit 94 between the connecting surface 95 and the assembly surface 96, opening out respectively at these surfaces. They are provided for communicating connection with the operating passages 21, 22 of the valve module 2 and the connecting passages 100, 101, when the additional module 6, 7 is attached in the direction of assembly 92 to the valve module 2 or in a cascaded arrangement to a preceding additional module 6, 7.

The connecting passages 100, 101 each represent a communicating connection between the fluid passages 98, 99 and the attaching surface 97. The connecting passage 100 assigned to the fluid passage 98 is introduced into the passage unit 94 as a bore at right-angles to the attaching surface 97 and runs in a centre plane 102 which divides the passage unit 94 in half. Starting from the attaching surface 97, the connecting passage 101 assigned to the fluid passage 99 also runs initially in the centre plane 102. To avoid any intersection with fluid passage 98, parts of the connecting passage 101 are guided in an adjacent plane 103 aligned parallel to and at a distance from the centre plane 102. For communicating connection of the passage section of the connecting passage 101 in the centre plane 102 with the passage section of the connecting passage 101 in the adjacent plane 103, transverse bores 104, 105 are provided, which in part pass through the passage unit 94.

A valve unit 12 shown only schematically in FIGS. 1 and 2, and which is of identical design to the valve units 12 for the valve module 2, may be mounted on the passage unit 94 shown in FIGS. 6 and 7. With its fluidic connections the valve unit 12, which is mounted with sealing on the attaching surface 97, makes communicating connection with the connecting passages 100, 101 and therefore with the fluid passages 98, 99. By this means a transverse flow between the fluid passages 98, 99, which for their part may be connected to communicate with the operating passages 21, 22 of the valve module 2, may be controlled by the valve unit 12.

Provided for mounting the passage unit 94 on a valve module 2 or on a further additional module 6, 7 are the mounting means 106, for example in the form of a hollow screw. The mounting means 106 comprise a cylindrical-sleeve-shaped shank section 107, adjacent to which is a similarly cylindrical-sleeve-shaped head section 108. The shank section 107 is provided in an end section facing away from the head section 108 with an external thread, not shown in detail. In the head section 108 the mounting means 106 have an internal thread, which is designed to accommodate the external thread of a further mounting means 106.

The shank section 107 has adjacent to the external thread an all-round slot-like fluid recess 109. The fluid recess 109 creates, by means of a fluid orifice 110, a communicating connection between an inside bore 111 bounded in the mounting means 106 by the cylindrical-sleeve-shaped configuration and the respective fluid passage 98, 99 or the connecting passages 100, 101 opening out therein.

Each of the fluid passages 98, 99 is provided in the area of their openings with a continuous slot, which has the purpose of accommodating a seal ring 112, preferably made of rubber-elastic material. With the aid of the seal rings 112, a sealing connection between the fluid passages 98, 99 and the operating passages 21, 22 of the valve module 2 may be ensured.

In an embodiment of the invention which is not illustrated, a functional unit in the form of a measuring device is mounted with sealing on the passage unit. The functional unit has an integral fluid passage which has communicating connection with one or both of the connecting passages 100, 101. For example a measuring probe extends into the fluid passage or a measuring probe is located next to a passage wall of the fluid passage, to determine directly or indirectly one or more parameters of the flowing fluid.

The invention claimed is:

1. A valve device for the supply of fluid to fluid consumers, with several valve modules arranged next to one another in a direction of stacking, wherein each valve module comprises a plate-shaped passage body which has a feed passage recess designed for connection with a fluid source, two operating passages provided for coupling to the fluid consumers, and a venting passage recess for venting the fluid consumers, together with two connection surfaces, parallel and opposite to one another, and outside surfaces aligned at right-angles to the connection surfaces, wherein the connection surfaces determine the direction of stacking and are designed to abut passage bodies adjacent to the connection surfaces, and four 2/2-way valves each having a first and second fluidic connection and a movable valve member for the setting of a free fluid passage cross-section between the first and second fluidic connection, wherein the four 2/2-way valves of the valve modules are connected to one another in a full bridge arrangement in which the first fluidic connections of the first and second 2/2-way valves are connected to the feed passage recess, the second fluidic connection of the first 2/2-way valve and the first fluidic connection of the fourth 2/2-way valve are connected to a first operating passage, the second fluidic connection of the second 2/2-way valve and the first fluidic connection of the third 2/2-way valve are connected to a second operating passage, and the second fluidic connections of the third and fourth 2/2-way valves are connected to the venting passage recess, and wherein each 2/2-way valve includes an electrically operable actuating means which is fitted on to an outer surface of the passage body serving as a mounting face, and is designed to switch the respectively assigned movable valve member between a closed position and an open position, wherein there is provided at a connection face of the passage body an additional module which is connected so as to communicate with one or both operating passages and is designed to control a fluid flow and/or to determine a parameter of the fluid flow from or to the operating passage.

2. A valve device according to claim 1, wherein the additional module is designed for lining up side by side in a direction of assembly at right-angles to the direction of stacking, at the connection face of the valve module or another additional module, in order to form an additional module assembly.

3. A valve device according to claim 1, wherein the additional module includes a passage unit with a fluid passage for communicating connection with one or both operating passages of the passage body, plus a functional unit fitted on to the passage unit for controlling and/or scanning the fluid flows in the fluid passage from or to one or both operating passages.

4. A valve device according to claim 3, wherein the fluid passage passes through the passage unit and, when the additional module is fixed to the passage body, is aligned at right-angles to the connection face, and there is formed in the passage unit a connecting passage for a communicating connection between the fluid passage and the functional unit.

5. A valve device according to claim 3, wherein the fluid passage extends between opposite contact faces of the passage unit.

6. A valve device according to claim 3, wherein the fluid passage is designed to accommodate mounting means, used to fix the additional module to the passage body or to another additional module.

7. A valve device according to claim 6, wherein the mounting means are provided at opposite end areas with a head section and a shank section in one direction of longitudinal extent, with a longitudinal recess passing through them, extending between shank section and head section and opening out at each end to allow communicating connection between additional modules arranged next to one another in the direction of assembly, wherein the shank section is designed to engage in the operating passage of the passage body or in the head section of further mounting means.

8. A valve device according to claim 7, wherein the mounting means have a connection recess communicating with the longitudinal recess and aligned at right-angles to the direction of longitudinal extension, and designed to provide a communicating connection between the longitudinal recess and the connecting passage.

9. A valve device according to claim 3, wherein the functional unit is in the form of a pressure sensor and/or a flow sensor and/or a temperature sensor and/or a humidity sensor for determining an electrical measuring signal based on fluid flowing in the operating passage, and for supplying this measuring signal to a control unit.

10. A valve device according to claim 3, wherein the functional unit is in the form of a 2/2-way valve.

11. A valve device according to claim 10, wherein the passage unit includes a first and a second connection passage, wherein the first connecting passage makes communicating connection with the first fluid passage and a first fluidic connection of the functional unit, and the second connecting passage makes communicating connection with the second fluid passage and a second fluidic connection of the functional unit.

12. A valve device according to claim 1, wherein the 2/2-way valves are in the form of valve units in which the electrically operable actuating means form with one valve section a compact unit which is attached to the mounting face of the passage body, wherein the valve section comprises the first and second fluidic connection plus a valve seat, relative to which the movable valve member is movably mounted, in order to control the free fluid passage cross-section between the first and second fluidic connection, between a closed position and an open position.

* * * * *